(12) United States Patent
Raymond et al.

(10) Patent No.: US 12,181,690 B2
(45) Date of Patent: Dec. 31, 2024

(54) MICRO-OPTIC ANTICOUNTERFEITING ELEMENTS FOR CURRENCY AND OTHER ITEMS USING VIRTUAL LENS SYSTEMS

(71) Applicant: Lumenco, LLC, Englewood, CO (US)

(72) Inventors: Mark A. Raymond, Littleton, CO (US); Hector Andres Porras Soto, Littleton, CO (US)

(73) Assignee: Lumenco, LLC, Englewood, CO (US)

( * ) Notice: Subject to any disclaimer, the term of this patent is extended or adjusted under 35 U.S.C. 154(b) by 0 days.

(21) Appl. No.: 17/887,666

(22) Filed: Aug. 15, 2022

(65) Prior Publication Data

US 2024/0012181 A1    Jan. 11, 2024

Related U.S. Application Data

(60) Provisional application No. 63/358,747, filed on Jul. 6, 2022.

(51) Int. Cl.
*B42D 25/00* (2014.01)
*B42D 25/29* (2014.01)
(Continued)

(52) U.S. Cl.
CPC ........... *G02B 3/0056* (2013.01); *B42D 25/29* (2014.10); *B42D 25/47* (2014.10); *G02B 3/0031* (2013.01); *G02B 3/0075* (2013.01)

(58) Field of Classification Search
CPC ... G02B 3/0056; G02B 3/0031; G02B 3/0075
See application file for complete search history.

(56) References Cited

U.S. PATENT DOCUMENTS 4,164,748 A    8/1979 Nagata
4,387,959 A    6/1983 Lange et al.
(Continued)

FOREIGN PATENT DOCUMENTS

GB          2594474 A  * 11/2021  ............ B41J 2/2135
WO   WO-2019197798 A1 * 10/2019  ............... B32B 3/26

OTHER PUBLICATIONS

Vetro, Anthy, et al., "Coding Approaches for End-To-End 3D TV Systems" Mitsubishi Electric Research Laboratories, Dec. 2004, TR2004-137.
(Continued)

*Primary Examiner* — Kyle R Grabowski
(74) *Attorney, Agent, or Firm* — Hall Estill Law Firm

(57) ABSTRACT

An optical security element to limit counterfeiting. The element includes a lens array with a first side and a second planar side opposite the first side. A plurality of lenses are formed on the first side of the lens array, and an ink layer is provided proximate the second planar side. The ink layer provides an interlaced image, which includes a matrix of frame or image elements under each of a plurality of lens sets or "virtual lenses," each of which includes at least four lenses arranged in a grouping with an equal or unequal number of lenses on a side (e.g., a 2 by 2 array or a 2 by 3 array). The interlaced element are arranged in non-sequential order in two interlacing axes (e.g., via non-sequential interlacing in both directions) to be distributed throughout an area under the at least four lenses rather than under a single lens.

21 Claims, 6 Drawing Sheets

(51) Int. Cl.
   *B42D 25/47*     (2014.01)
   *G02B 3/00*      (2006.01)

(56) References Cited

U.S. PATENT DOCUMENTS

| | | | |
|---|---|---|---|
| 4,480,893 | A | 11/1984 | Fantone |
| 5,012,274 | A | 4/1991 | Dolgoff |
| 5,616,912 | A | 4/1997 | Robinson et al. |
| 5,695,346 | A | 12/1997 | Sekiguchi et al. |
| 5,731,883 | A | 3/1998 | Morton et al. |
| 5,731,899 | A | 3/1998 | Meyers |
| 5,835,194 | A | 11/1998 | Morton |
| 5,842,762 | A | 12/1998 | Clarke |
| 5,924,870 | A | 7/1999 | Brosh et al. |
| 5,933,228 | A | 8/1999 | Taylor et al. |
| 5,959,718 | A | 9/1999 | Morton |
| 5,967,032 | A | 10/1999 | Bravenec |
| 6,091,479 | A | 7/2000 | Frosig et al. |
| 6,177,953 | B1 | 1/2001 | Vachette et al. |
| 6,224,214 | B1 | 5/2001 | Martin et al. |
| 6,256,149 | B1 | 7/2001 | Rolfe |
| 6,424,467 | B1 | 7/2002 | Goggins |
| 6,481,849 | B2 | 11/2002 | Martin et al. |
| 6,490,093 | B2 | 12/2002 | Guest |
| 6,624,946 | B2 | 9/2003 | Franko, Sr. |
| 6,781,761 | B2 | 8/2004 | Raymond |
| 6,795,250 | B2 | 9/2004 | Johnson et al. |
| 6,831,787 | B1 | 12/2004 | Scarbrough et al. |
| 6,859,240 | B1 | 2/2005 | Brown et al. |
| 6,943,953 | B2 | 9/2005 | Raymond |
| 6,984,425 | B2 | 1/2006 | Raymond |
| 6,995,913 | B2 | 2/2006 | Goggins |
| 7,002,748 | B1 | 2/2006 | Conley et al. |
| 7,016,116 | B2 | 3/2006 | Dolgoff |
| 7,019,865 | B2 | 3/2006 | Nims et al. |
| 7,038,854 | B2 | 5/2006 | Raymond |
| 7,046,271 | B2 | 5/2006 | Doerfel et al. |
| 7,057,823 | B1 | 6/2006 | Raymond |
| 7,075,725 | B2 | 7/2006 | Tomczyk |
| 7,083,340 | B2 | 8/2006 | Goggins |
| 7,149,035 | B2 | 12/2006 | Goggins |
| 7,151,541 | B2 | 12/2006 | Seder |
| 7,153,047 | B2 | 12/2006 | Goggins |
| 7,164,537 | B2 | 1/2007 | Raymond |
| 7,307,790 | B1 | 12/2007 | Raymond et al. |
| 7,414,790 | B2 | 8/2008 | Raymond et al. |
| 7,480,100 | B1 * | 1/2009 | Raymond ............... G02B 27/06 40/454 |
| 2002/0021832 | A1 | 2/2002 | Dawson |
| 2002/0135177 | A1 | 9/2002 | Welch |
| 2003/0103351 | A1 | 6/2003 | Privas et al. |
| 2004/0043203 | A1 | 3/2004 | Bogdanovic |
| 2004/0263885 | A1 | 12/2004 | Tomczyk |
| 2005/0135798 | A1 | 6/2005 | Szajewski et al. |
| 2005/0180006 | A1 | 8/2005 | Mendoza |
| 2005/0286134 | A1 | 12/2005 | Goggins |
| 2006/0052152 | A1 | 3/2006 | Tedsen et al. |
| 2006/0082877 | A1 | 4/2006 | Wang |
| 2006/0146410 | A1 | 7/2006 | Krause |
| 2013/0154250 | A1 * | 6/2013 | Dunn .................... B42D 25/21 283/67 |
| 2015/0343830 | A1 * | 12/2015 | Raymond ............ B42D 25/342 101/483 |
| 2019/0236887 | A1 * | 8/2019 | Rich ..................... B42D 25/45 |

OTHER PUBLICATIONS

PCT International Search Report and the Written Opinion of the International Searching Authority, or the Declaration, Nov. 13, 2008, corresponding foreign application No. PCT/US2008/079862.

\* cited by examiner

MICRO-OPTIC ANTICOUNTERFEITING ELEMENTS FOR CURRENCY AND OTHER ITEMS USING VIRTUAL LENS SYSTEMS

CROSS-REFERENCE TO RELATED APPLICATIONS

This application claims the benefit of U.S. Provisional Application No. 63/358,747, filed Jul. 6, 2022, which is incorporated herein by reference in its entirety.

BACKGROUND

1. Field of the Description

This description is generally directed toward products such as polymer and other bank notes (or currency) and other items with optical security features, and, more particularly, to a new configuration for an optical security element (e.g., a strip or other-shaped feature providing micro-optic anti-counterfeiting features) for products, such as bank notes/currency, that provides high quality imagery by utilizing two or more lenses as a virtual lens system under which a larger amount of image data (or frames) may be interlaced to facilitate use of thinner optical elements.

2. Relevant Background

There are many products presently manufactured and distributed with optical security features so as to try to limit copying and counterfeiting. One of the most prevalent of these products is currency of a country used daily in commerce. Other examples include tags or labels provided on clothing and other consumer items and credit and bank cards. It is desirable to provide optical security features on these and other products with minimal cost while also providing high levels of anti-counterfeiting protection. The anti-counterfeiting market is rapidly growing worldwide with anti-counterfeiting elements placed on a wide range of items such as upon currency (e.g., on a surface of a paper bill or note to help prevent copying) and on labels for retail products (e.g., labels on clothing showing authenticity).

An optical security feature may take the form of a lens array (e.g., a lenticular lens array (linear lenses) or an array of round, hexagonal, aspherical, or other-shaped lenses) that is used to display an image (e.g., an interlaced image) printed on an opposite planar side of the transparent substrate of the lens array. The resulting displayed or visible image may be a three dimensional (3D) image, an image that is animated with movement of the bank note (or with differing viewing angles), an image provided by a full volume pixel map or moiré pattern, and/or an image providing other optical effects available through the use of lenticular, diffraction, and other optical technologies.

Printed micro lens-based security features or elements for currency and brand protection are generally regarded as being more secure than holography and other methods of anti-counterfeiting due to the difficulty of production and manufacturing. Traditional printing methods are not viable for features (for lens arrays) with thicknesses under about 50 microns because commercially available printing resolutions are less than about 5,000 dots per inch (DPI). Even with advanced printing methods, creating complex imagery, animation and three dimensional (3D) effects is very difficult and can require resolutions of more than 20,000 DPI. However, even with very high resolutions the resulting effects are very limited.

Hence, there remains a need for new designs of optical security features or elements that can achieve effects desirable to support anti-counterfeiting even with presently available printing resolutions. Any advantage in resolution can improve the optical security feature dramatically and can also reduce the thickness needed for the optical security feature. The need for improved optical security features with decreased thickness needs to be addressed as it continues to limit the quality and effectiveness of micro-optic security features.

SUMMARY

With the above issues and needs in mind, the inventors recognized that, for magnifying moiré micro-optic features and interlaced micro-optic features, all the data required to make the effect presently needs to be under each individual lens of a lens array. As the thickness of the lens array decreases, the lenses have to be reduced in size, and, as a result, there is less space available under each of the lenses for imagery or image data typically in the form of an interlaced image. To have a good focusing lens at under 25 microns in diameter (i.e., an often stated goal in the anti-counterfeiting industry), the lens may still have to be about 20 microns in diameter due to present fabrication limitations. Hence, to have an desirable image effect, it may be desirable or even required to provide about 400 image frames in a 20 by 20 matrix (or interlaced image) under each lens. However, the printing can become exponentially more difficult for such an optical security feature.

Further difficulties arise in fabricating such an optical security feature because to create a flat lens (or a lens with no profile) that has no spaces or voids to receive soiling materials that may undesirably "fill in" the lens, the lens array may be required to have about a 1.38 refractive index. Since air has a 1.0 refractive index, the increase in focal length of the micro lens is 2 to 3 times. Therefore, to maintain the very small thickness or, in other words, the "thinness" required for optical security features such as currency threads and other anti-counterfeiting items, one of the only available solutions in the past has been to reduce the lens size to hit the thickness targets. Typically, a 24-micron lens that has a 28-micron focal length would have to be reduced to about 10 microns or to a lens that only provides a 100 square microns canvas for printing of the interlaced image. Such a small canvas under each lens presents a significant, and sometimes insurmountable, challenge for printing under these small lenses while achieving meaningful and useful (in an anti-counterfeiting sense) effects. Presently, the inventors are unaware of any existing printing technology that can provide the resolution needed to make an effect demanded by the users of optical security features.

Briefly, a lens-based display apparatus or assembly is described herein that is useful as an optical security feature or element in currency (including bank notes) and nearly any other product for which anti-counterfeiting features are desired. The interlacing techniques described herein are especially well suited for thin security films and lenses that are not linear such as round, square, hexagonal, and aspheric lenses presently used in many optical security features. The display apparatus (or optical security feature/element) includes a lens array with a first or exterior side including a plurality of lenses and a second side, opposite the first side, that is planar. The display apparatus also includes a printed interlaced image (or ink layer) proximate to or on the second side of the lens array.

Significantly, the inventors discovered and designed interlacing techniques for creating the interlaced image such that the image data does not have to be provided under a single lens of the lens array as was the case with prior optical security elements. In the lens array of the present description, a "virtual lens" or a lens set is formed by combining four to twelve (or more) lenses and then pairing a set of interlaced image elements with each of these virtual lenses. The interlaced image elements (or interlaced images) are spread throughout the lenses of the virtual lens or lens set by arranging the images or image elements in a non-sequential order, which is typically created through the use of a ray tracing algorithm or program. In the four lens implementation, for example, the combined lenses are selected to be a two by two grouping of adjacent pairs of the lenses, which may be round in shape (or other non-linear lens shapes).

Uniquely, non-sequential interlacing (rather than sequential interlacing as is the case with use of a single lens) is performed in both directions or along two axes of this two by two grouping of lenses to define the interlaced image to be provided by the printing process. The non-sequential interlacing may be performed based on a ray tracing program such that a mismatch is created between the resolution and the lens space under the virtual lens or lens set. In a conventional lenticular-based security element, it is required that there be a divisible number between the lens size and the number of pixels (or frames). In other words, if the optical security element has a 100 LPI lens, the interlaced image would preferably have 500, 600, 700, 800, 900, 1000 DPI and so on such that the number of pixels per lens is integer to avoid creating artifacts in the image. The interlacing performed to provide an interlaced image under a virtual lens or a lens set, in contrast, is configured to intentionally provide a mismatch. Significantly, as a result of this intentional mismatch between the lens resolution and lens space, there is always at least one pixel or frame of the interlaced image at a position or location between each pair of adjacent lenses in each interlacing direction (or along both interlacing axes).

Still further, the inventors discovered through experimentation that improved results in image or effect quality are obtained by configuring or designing the ray tracing algorithm such that image elements that have values indicating they are nearby to each other in the sequential arrangement of the images or frames being interlaced be positioned in matching or similar locations underneath each of the lenses in the virtual lens or lens set. For example, a first lens in a two by two lens set may have a first focal location (e.g., a center point of the lens) that focuses upon the seventh image element in a sequence containing eleven image element. In this case, visual displays or effects are enhanced by performing the non-sequential interlacing such that a second lens (adjacent the first lens) has a second focal location (e.g., a center point of the lens) that focuses upon the sixth or eight image element (i.e., an image element that is adjacent the image element in the sequential ordering of the images) or another spacing that results in the image being relative "close" to the image focused upon by the other lens in the virtual lens. Stated differently, the location within the sequential ordering of the image or image elements after the non-sequential interlacing is performed preferably will be within 4 places, more preferably within 3 places, still more preferably within 2 places, and most preferably within 1 place (as in the above example for a 2 by 2 virtual lens or lens set).

As will be understood by those in the arts, the non-sequential interlacing along will produce a matrix of image elements, which will be printed to provide the interlaced image of display apparatus or assembly. As one useful example, an ideal 20 by 20 image frame matrix needed under a 10-micron lens (i.e., 400 image frames) would require a 500-nanometer (nm) pixel or require 50,000 DPI resolution, which is not practical or even, in most cases, possible with today's printing technologies. In contrast, though, a display apparatus that makes use of a 2 by 2 (or 4-lens) virtual lens or lens set as taught by the inventors provides a 400 square micron space or canvas for printing the 20 by 20 image element or frame matrix. Importantly, the new virtual lens or lens set reduces the resolution needed for printing the interfaced image or ink layer of the display apparatus (or optical security feature) by 50 percent down to 25,000 DPI, which is much more readily achieved with presently available printers and/or print technology.

More particularly, an optical security element is provided for application to a product to limit counterfeiting. The optical security element (or lens-based display device) includes a lens array with a first side and a second planar side opposite the first side. In the element, a plurality of lenses are provided or formed on the first side of the lens array and an ink layer is printed or provided proximate the second planar side. The ink layer is configured or printed to provide an interlaced image, which includes a matrix of frame or image elements under each of a plurality of lens sets within the lenses formed on the first side of the lens array. Significantly, each of the lens sets (or "virtual lenses") includes at least four lenses.

In some embodiments of the optical security element, the at least four lenses are arranged in a grouping with an equal number of lenses on a side (e.g., a 2 by 2, a 2 by 3, a 2 by 4, a 3 by 3, a 3 by 4, a 3 by 5, and so on array or arrangement). In such cases, the frame or image elements in the matrix are preferably arranged in a non-sequential order in two interlacing axes (e.g., via non-sequential interlacing in both directions), whereby the frame or image elements are distributed throughout an area under the at least four lenses rather than under a single lens. In some preferred implementations, the non-sequential order is configured such that a mismatch exists between a resolution and a lens space of each of the lens sets, whereby there is a mismatch of evenly divided frames of the interlaced image under any one of the lenses. In this or other cases, the interlaced image can be configured such that there is at least one of the frame or image elements (e.g., a pixel) positioned in the area to be disposed between each adjacent pair of the lenses in each of the lens sets. The non-sequential order can also be configured to place the frame or image elements, under adjacent ones of the lenses in the grouping at matching focus locations, such that the placed frame or image elements are within at least five within a sequential ordering of the frame or image elements.

In some embodiments of the optical security element, the lenses are each spot focusing lens and wherein the lenses are round, square, hexagonal, radius, or elliptical lenses. In these or other embodiments, the lens array has a thickness of less than about 200 microns, the lenses are flat or no-profile lenses, and/or each of the lenses is a concave or convex lens. In such embodiments, the thickness of the lens array is less than 50 microns, the interlaced image is printed at a resolution greater than 5,000 dots per inch (DPI), and/or a viewing angle of each of the lenses is less than about 58 degrees. Additionally, it may be useful for a total number of the frame or image elements in the matrix is greater than twenty-five. With such an optical security element, a product can be fabricated with a body with a surface upon which the optical security element is affixed. Particularly, the body can be a body or substrate of a banknote, and the optical security element can be stamped via hot melt adhesive to the body. In other cases, the lenses can be made via cast and cure ultraviolet (UV) or via E-beam energy-cured polymers.

DETAILED DESCRIPTION

Briefly, the present description is directed toward products, such as branding labels, credit/debit/bank cards, and polymer bank notes, that are fabricated so as to include an optical security element (or feature or lens-based display apparatus or assembly, as these terms may be used interchangeably herein). The lens-based display apparatus or optical security element is uniquely configured to make use of lens sets or virtual lenses in a lens array rather than requiring that all the interlaced image data be printed under a single lens. Each virtual lens or lens set is provided by groups of adjacent lenses, e.g., a 2 by 2 grouping, a 3 by 3 grouping, a 4 by 4 grouping, a 2 by 3 grouping, a 2 by 4 grouping, a 3 by 3 grouping, a 3 by 4 grouping, a 3 by 5 grouping, and so on, and an interlaced image, which is printed on the planar side of the lens array or on the product body's surface, is configured to include interlacing normally provided for a single lens under the area under each of the virtual lens or lens set.

The interlacing of the frame or image elements is non-sequential in both directions or along the two orthogonal axes of the lens set, and the interlacing also is performed (such as based on a ray tracing program) to cause adjacent lenses along each axis to concurrently focus on nearby frames in the sequential order of the image element or frames (e.g., within 1 to 4 frames in the mathematical order of the overall frames such as with one lens focusing upon Frame 5 or 7 and an adjacent lens focusing on Frame 6). In some cases, such useful focusing of adjacent lenses in the lens set or virtual lens is achieved by selecting the number of frames (or pixels) to interlace such that a mismatch is created between the resolution and the lens space under the virtual lens or lens set. Particularly, it is desirable that there is a mismatch of evenly divided frames within any one lens, whereby at least one pixel or frame in the interlaced image is positioned between (or at the mating point) between each adjacent pair of lenses in a virtual lens or lens set (which is in direct contrast to conventional interlacing practices for a lenticular lens array).

To reiterate or stress significant aspects of the invention, for the interlaced images under multiple lenses in a virtual lens not to fall on top of each other to the viewer observing an optical security element, the image sequences are preferably non-sequential and also, typically, chosen to not fall in the same mathematical space under each lens. To achieve this second design goal, it is desirable to create a mismatch, in both axes, between the resolution of the interlaced image and the lens space. In this way, frames provided back to the viewer by the optical security element with its plurality of virtual lenses or lens sets are not cancelled and are viewable to achieve high quality visual effects (such as a 3D effect, animation, or the like).

Figure 1:
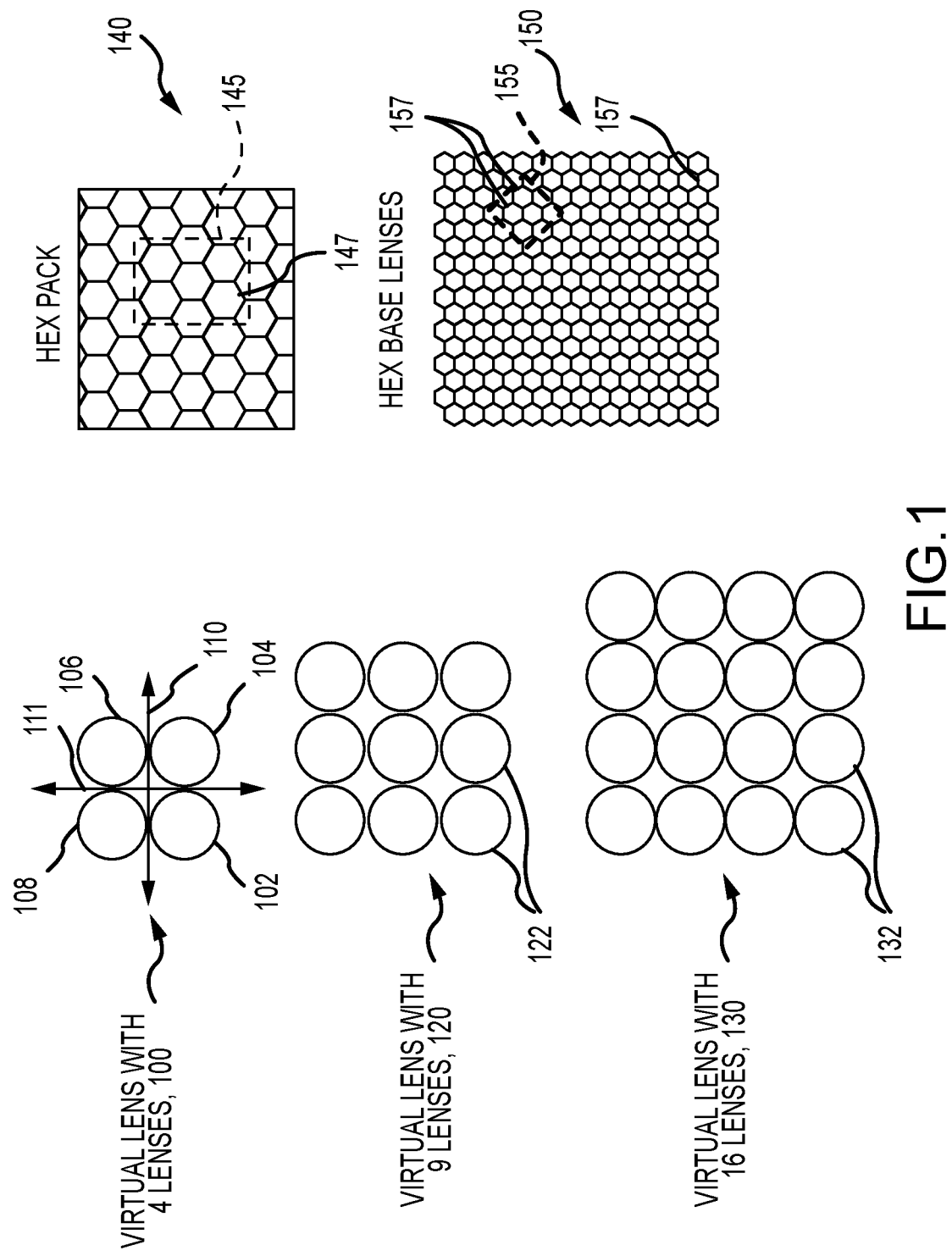
FIG. 1 illustrates, with top views, five exemplary lens sets or virtual lens configurations for use in the lens arrays of the optical security elements of the present description.

Virtual lenses of the lens array can utilize a variety of non-linear lenses such as round, square, and hexagonal lenses and/or with conventional radius lenses, with aspheric lenses, and with elliptical lenses. FIG. 1 illustrates, with top views, five exemplary lens sets or virtual lens configurations for use in the lens arrays of the optical security elements of the present description. As shown, a virtual lens or lens set 100 may be provided that combines four round or radius lenses 102, 104, 106, and 108 in a 2 by 2 grouping or arrangement. Stated differently, the lens set 100 is made up of two pairs of adjacent (or side-by-side or abutting, in some cases) lenses (such as lenses 102 and 104 and lenses 106 and 108). In an optical security element, a large number of such lens sets 100 would be provided upon a side of a lens array, and a planar side would be abutting or proximate to a printed ink layer or interlaced image. The interlaced image would be configured so as to use the space under all four lenses 102-108 as if it were a single lens, but with interlacing being non-sequential in both interlacing axes 110 and 111 (e.g., X and Y axes) to provide a matrix of image or frame elements/pieces that provide a desired visual effect when observed by a viewer.

Also shown in FIG. 1 are a virtual lens or lens set 120 that includes nine round or radius lenses 122 arranged in a 3 by 3 grouping, and, as with lens set 100, an interlaced image would be provided underneath the combined area underneath all nine of these lenses 122, with non-sequential interlacing again used in creating the matrix of image or frame elements under the lens set 120. Larger numbers of lenses may be included in a lens set as shown with virtual lens or lens set 130 that include sixteen lenses 132 arranged in a 4 by 4 grouping or arrangement. Again, interlacing of image or frame elements under all sixteen lenses 132 would be performed in a non-sequential manner in the two interlacing axes or two directions (as shown with arrows 110 and 111).

Other shapes of lenses may be used as illustrated with lens array 140 utilizing a plurality of lens sets 145 with hex packed round or radius lenses 147 (here a two by two grouping is utilized in the lens set 145). In contrast, lens array 150 is made up of hexagonal shaped or hex based lenses 157, which may be utilized as lens sets or virtual lenses 155 (with a two by two grouping or arrangement shown). As with the lens sets 120 and 130 a greater number of lenses may be used in lens arrays 140 and 150. Further, as discussed above, the lens size may vary significantly to practice the invention with lenses having a diameter less than about 30 microns being common and with lenses in the 10 to 25 micron range used in some prototypes.

To maximize the benefit of the virtual lens idea (and systems of such lens sets upon a lens array surface) and to maximize the number of image frames in the virtual lens system, the focal point of the lenses chosen for use in the lens array preferably are as sharp as possible to avoid ghosting to the viewer. Therefore, one useful lens design is a true focusing lens and not one that is just a magnifier. The maximum focus of a lens is an F-stop lens design, with the chord of the lens being equal to the focal length which requires a half circle lens. However, in many cases, this type of lens has a relative messy focus and would not be a preferred candidate for a lens in the virtual lens systems taught herein.

In some embodiments, the virtual lens or lens set may have differing numbers of lenses on its "side" rather than the equal-sided examples provided above with reference to FIG. 1. For example, instead of a 2 by 2 grouping, the virtual lens may include a 2 by 3, a 2 by 4, a 2 by 5 (or larger number). Likewise, a 3 by 4 or 3 by 5 (or larger number) grouping may be used. Providing more lenses along one axis of the virtual lens or lens set may be advantageous and desirable in some cases to achieve a more sophisticated effect in a certain direction of activation (e.g., up and down or side to side).

Figure 2:
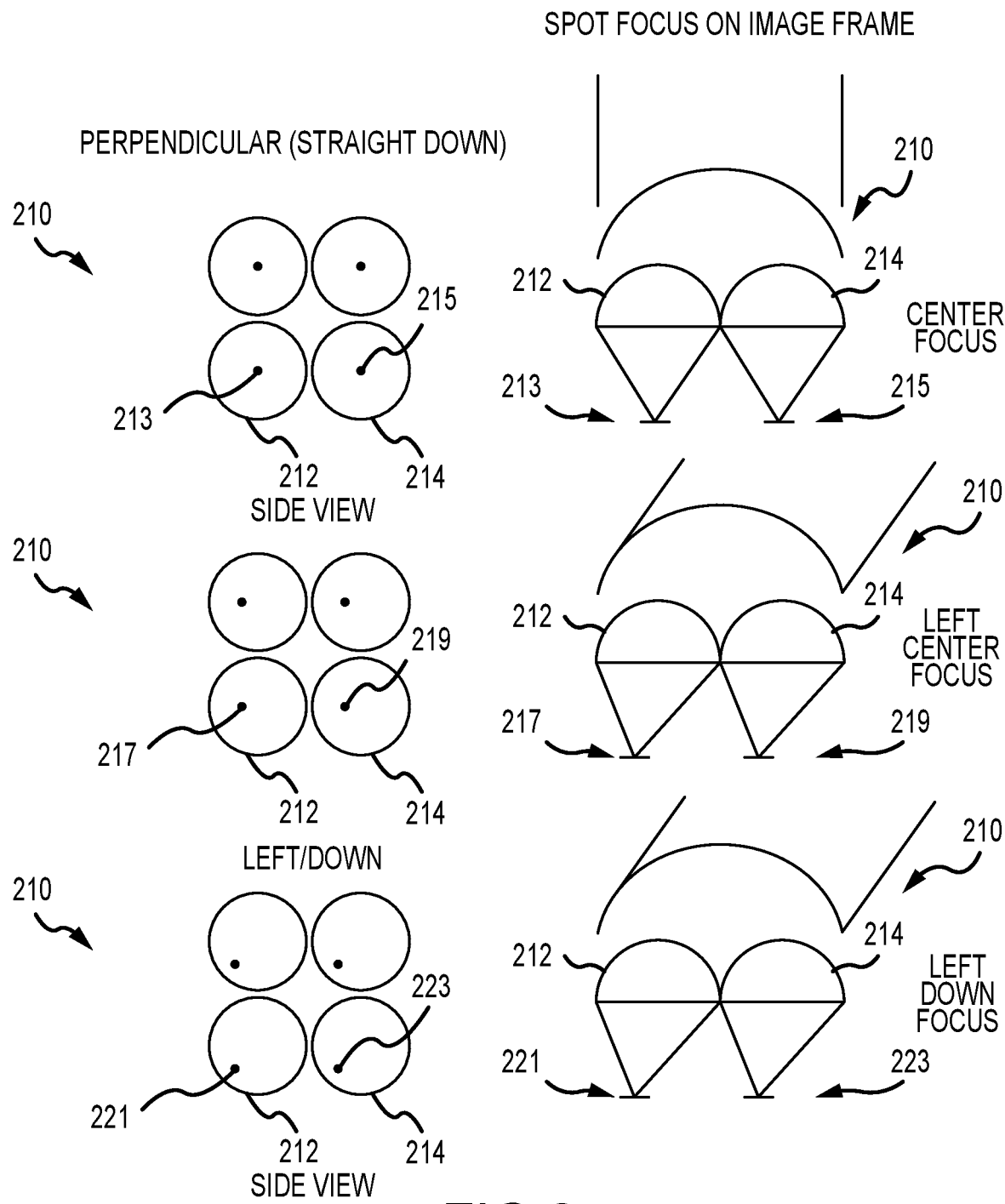
FIG. 2 illustrates top and side views of an exemplary 2 by 2 virtual lens or lens set illustrating spot focusing of paired lenses on differing portions of the interlaced image.

FIG. 2 illustrates top and side views of an exemplary 2 by 2 virtual lens or lens set 210 illustrating spot focusing of paired lenses on differing portions of the interlaced image (which may be printed on the planar back surface of the lens array including the lens set 210 or on a surface of the product's body (piece of currency, product label, or the like) so as to be aligned under each virtual lens or lens set 210). At the top of FIG. 2, the lens set 210 is shown when observed by a viewer looking perpendicular to or straight down on the lens set 210. The lens set 210 is a 2 by 2 grouping or arrangement of round or radius lenses. As shown, as an example, a first lens 212 of an adjacent pair focuses with spot focus on image frame (or interlaced portion or element) 213 while a second lens 214 of the adjacent pair focuses with spot focus on image frame 215.

As discussed above, the image or frame elements 213 and 215 would differ but would be relatively close in the sequential ordering or numbering with non-sequential interlacing being used to assign the image elements 213, 215 to the interlaced image provided under lens set 210. For example, an odd number of image or frame elements may be used to suit the even number of lenses (such as lenses 212 and 214) on a side of the lens set 210. In one example, 39 image frames may be interlaced into the matrix of the interlaced image, and, in this example, image element 213 could be Image Element No. 19 with image element 215 being relatively "close" (e.g., within about 4 images or frames) in the sequential order such as Image Element Nos. 15-23 (such as Image Element No. 18 or No. 20, in some useful implementations), with elements arranged such that there is a mismatch under each lens so that one of the elements is positioned between each adjacent pair of lenses (between lens 212 and lens 214 in this example).

FIG. 2 also shows a use case for the virtual lens 210 in which a viewer has a side view causing the spot focus to change to be onto image element 217 for lens 212 and onto image element 219 for lens 214. In the 39-frames example, image element 217 may be Image Element No. 5 or No. 7 while image element 219 would differ but be close such as Image Element No. 4, No. 6, or No. 8 or the like. Additionally, FIG. 2 shows a use case for the virtual lens 210 in which a viewer has a left and downward view causing the spot focus of the virtual lens 210 to change to be onto image element 221 for lens 212 and onto image element 223 for lens 214. In the 39-frames example, image element 221 may be Image Element No. 33 or No. 35 while image element 223 would differ but be close within the numbering of the sequential order such as Image Element No. 32, No. 34, or No. 36 or the like (e.g., within about four frames in the sequential order).

Figure 3:
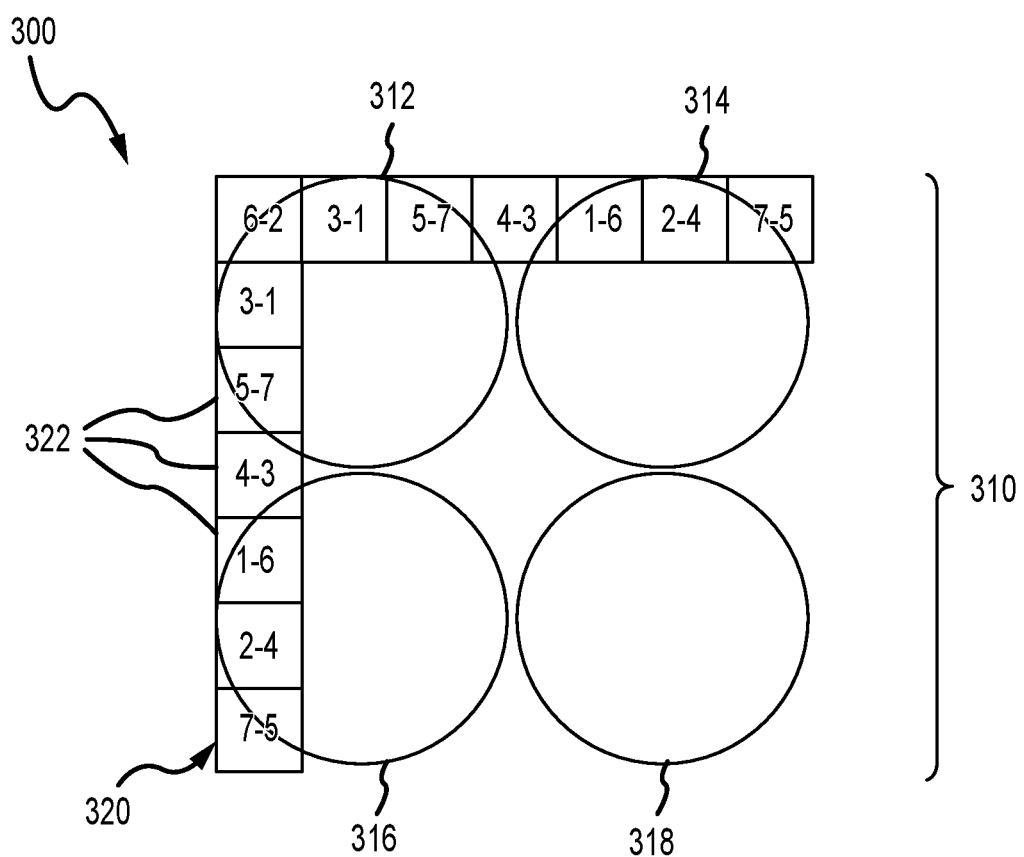
FIG. 3 is a top view of a portion of a lens array showing overlaying of one (of many) virtual lenses or lens sets upon an interlaced image matrix.

FIG. 3 illustrates a top view of a portion of a lens-based display device 300 of the present description showing one exemplary lens set or virtual lens 310, with it being understood that the lens array 300 would contain hundreds to thousands of such virtual lenses. As shown, the lens set 310 is made up of four round or radius lenses 312, 314, 316, and 318 arranged to be abutting at their outer diameters and to be in a 2 by 2 grouping or arrangement. The device 300 includes an interlaced image (or matrix of interlaced images) 320 that includes a 7 by 7 image matrix formed of interlaced image or frame elements 322 (with only a pair of outer rows shown with it being understood the interlacing would continue from these to the entire space under the four lenses 312-318). As shown, non-sequential frames (or image/frame elements) 322 are provided in both directions (of along two transverse (and often orthogonal) interlacing axes), with the order provided based on ray tracing such that the image or image frames assemble in order correctly to a viewer with the non-sequential mapping shown for ink layer or interlaced image 320 and with the number of frames chosen so that there is a frame 322 (e.g., Frame 4-3) positioned between adjacent pairs of lenses (pair 312/314 and pair 312/316 and so on).

The virtual lens and corresponding interlacing approach taught herein provides a number of advantages and unique features. The virtual lenses described generally combined four to sixteen (or more) individual lenses into a lens set, and, in a lens-based display device or optical security element, each of these lens sets were provided in a lens array so as to be positioned over a matrix of interlaced images (or the printed interlaced image or ink layer of the optical security element). The lenses may be round, square, or hexagonal or any other shape that provides a spot focus including a radius lens, an elliptical lens, or an aspheric lens. The lens array may have a thickness that is quite thin such as less than about a 200-micron focal length, and the lenses may be formed with flat or no profile lenses. The lenses may be convex or concave to fabricate the lens array. The viewing angle of the lenses preferably will be less than about 58 degrees in some implementations.

The optical security element may have an overall thickness, such as when intended for use as a security thread for currency or another product, that is less than 50 microns such as 35 micron or less. The lenses may be made or provided on a surface of the lens array via cast and cure UV or using E-beam energy-cured polymers. The lens array or film may be stamped, e.g., via hot melt adhesive, onto a banknote or other product while in other cases the interlaced image is attached to the currency or other product (e.g., a package) and then the lens array is applied to provide the optical security element.

The ink layer or printed interlaced image/matrix is formed using non-sequential interlacing in two axes and the interlaced frames are distributed throughout the area under at least four lenses, which are typically spot focusing lenses. The interlaced image or ink layer may be printed on the planar backside (opposite the lenses of the virtual lens system) using a process that yields greater than 5,000 DPI resolution. The total number of frames or image elements being interlaced into a matrix may be at least 25 (or at least five along each axis for a 5 by 5 or larger matrix of image element). The combination of the interlaced image and lens array with its virtual lens system (e.g., a plurality of lens sets as discussed herein) is configured such that the rays of light exiting the lenses are in the right or correct order to the viewer, even though the frames or image elements were printed (and provided under the lenses) in a non-sequential order.

Figure 5:
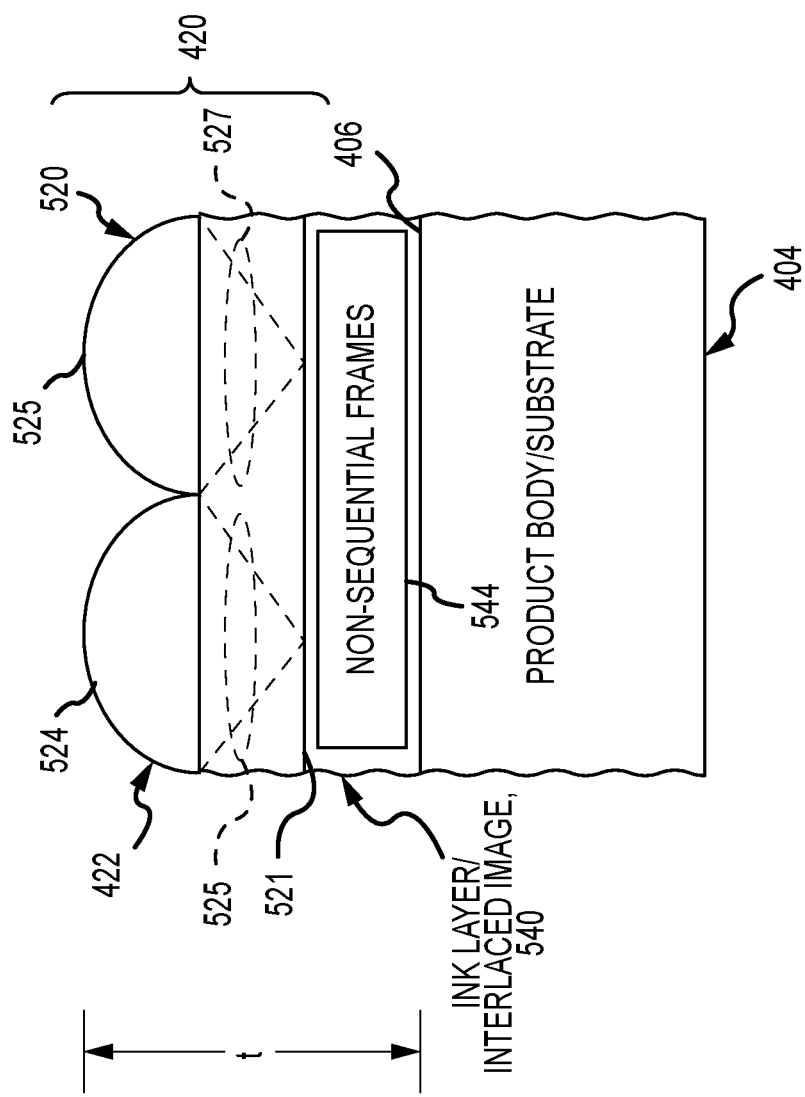
FIG. 5 is a simplified schematic, cross sectional view of the product of FIG. 4 showing an enlarged view of a single virtual lens or lens set of the lens array of the optical security element.
Figure 4:
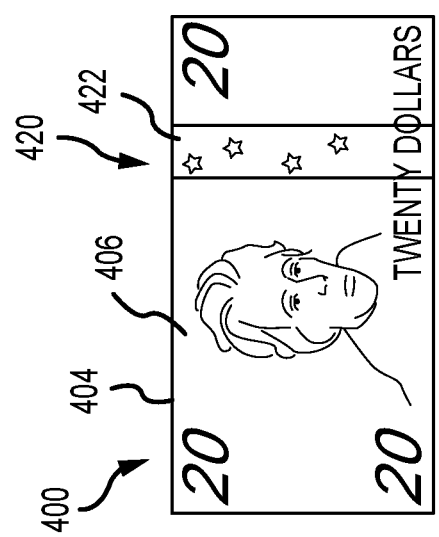
FIG. 4 is a top view of an exemplary product or object (e.g., a banknote or currency) with an optical security element of the present description.

FIG. 4 is a top view of an exemplary product or object 400 with an optical security element 420 of the present description, and FIG. 5 is a simplified schematic, cross sectional view of the product of FIG. 4 showing an enlarged view of a single virtual lens or lens set of the lens array 520 of the optical security element 420. In this example, the product 400 takes the form of currency or a banknote with a planar body or substrate 404 with a first (or top) surface 406. The optical security element 420 is attached or provided upon the first/top surface 406 of the product 400 with a first or outer surface 422 of the lens array 520 facing outward or away from the body 404. As discussed throughout this description, the optical security element 420 is configured to provide one or more visual effects (e.g., display 3D or animated images) when light is directed onto the surface 406 and the product 400 is viewed by a viewer or user.

To this end and with reference to FIG. 5, the optical security element 420 is mounted onto the top or first surface 406 of the product's body/substrate 404. Specifically, the optical security element 420 includes a lens array 520 overlaying an ink layer or interlaced image (or matrix of interlaced frame or image elements) 540, and the element 420 may have an overall thickness, t, of less than 50 microns such as in the range of 25 to 35 microns (or less). The ink layer 540 may be printed upon the second or planar back surface 521 of the lens array 520 (opposite the first or outer surface 422 of the lens array 520, with the optical security element 420 then being applied to surface 406) or be applied to the surface 406 of the product's body/substrate 404.

The lens array 520, which may be formed of a thin film of transparent plastic or other material, is fabricated (such as via cast and cure UV, via use of E-beam energy with the film being an energy-cured polymer, or other useful process for forming flat or no-profiled lenses) to include a plurality of non-linear lenses (such as the round or radius lenses shown in FIG. 5 that may preferably be formed to have a viewing angle less than about 58 degrees). In the illustrated example, a virtual lens or lens set is shown formed on side 422 of the array 520 opposite planar back surface 521 and the lens set includes four lenses with two lenses 524 and 526 shown in this side sectional view. Dashed lines 525 and 527 are provided to generally illustrate one focusing position or view provided by the lenses 524 and 526 of this lens set (such as when the optical security element 420 is viewed straight down or perpendicularly).

As discussed above, it is desirable that the number of frames or images being interlaced is divided by the number of lenses on a side of a virtual lens or lens set be a non-integer. Here an even number (i.e., two) of lenses 524 and 526 are provided on a side of the virtual lens in the lens array 520 such that it would be desirable that an odd number of frames or images be interlaced (e.g., 39 frames may be interlaced in some examples) within the interlaced image or ink layer 540. In a sequential or conventional interlacing approach, these frames or images would be sequentially ordered (e.g., in the 39 frame example, Frame/Image element No. 1, No. 2, No. 3, and so on up to No. 39). In the optical security element 420 it is desirable to provide non-sequential interlacing in both directions or along the two (typically orthogonal) interlacing axes with non-sequential or scrambled frames. In the illustrated embodiment, this non-sequential interlacing is performed such that there is a mismatch between the resolution of the interlaced image 540 (or number of frames or pixels in each direction) and the lens space of the lens set 520, whereby one (or more) of the frames 544 is located between adjacent pairs of the lenses (e.g., underneath the mating edges of lenses 524 and 525 in FIG. 5).

Further, the interlacing may be performed via use of results of raytracing, with the raytracing performed such that the lenses of the virtual lens or lens focus on frames or image elements in the interlaced image that are relatively close (e.g., within a predefined number of frames/image elements such as within 5, within 4, within 3, within 2, or even within 1) within the sequential ordering of the frames/images used in the interlaced image. In the example of focusing states 525 and 527 and an interlacing of 39 frames/images, the interlacing may be configured via the ray tracing to provide Frame or Image Element No. 19 in the non-sequential frames 544 at focal point 525 and Frame or Image Element No. 14, No. 16, No. 18, No. 20, No. 22, or No. 24 (with No. 18 or No. 20 being preferred in some cases as being closer). The interlacing is performed such that the rays exiting the lenses 524 and 526 are in the right or correct order to the viewer even though they are printed in the interlaced image or ink layer 540 in a non-sequential order.

Figure 6:
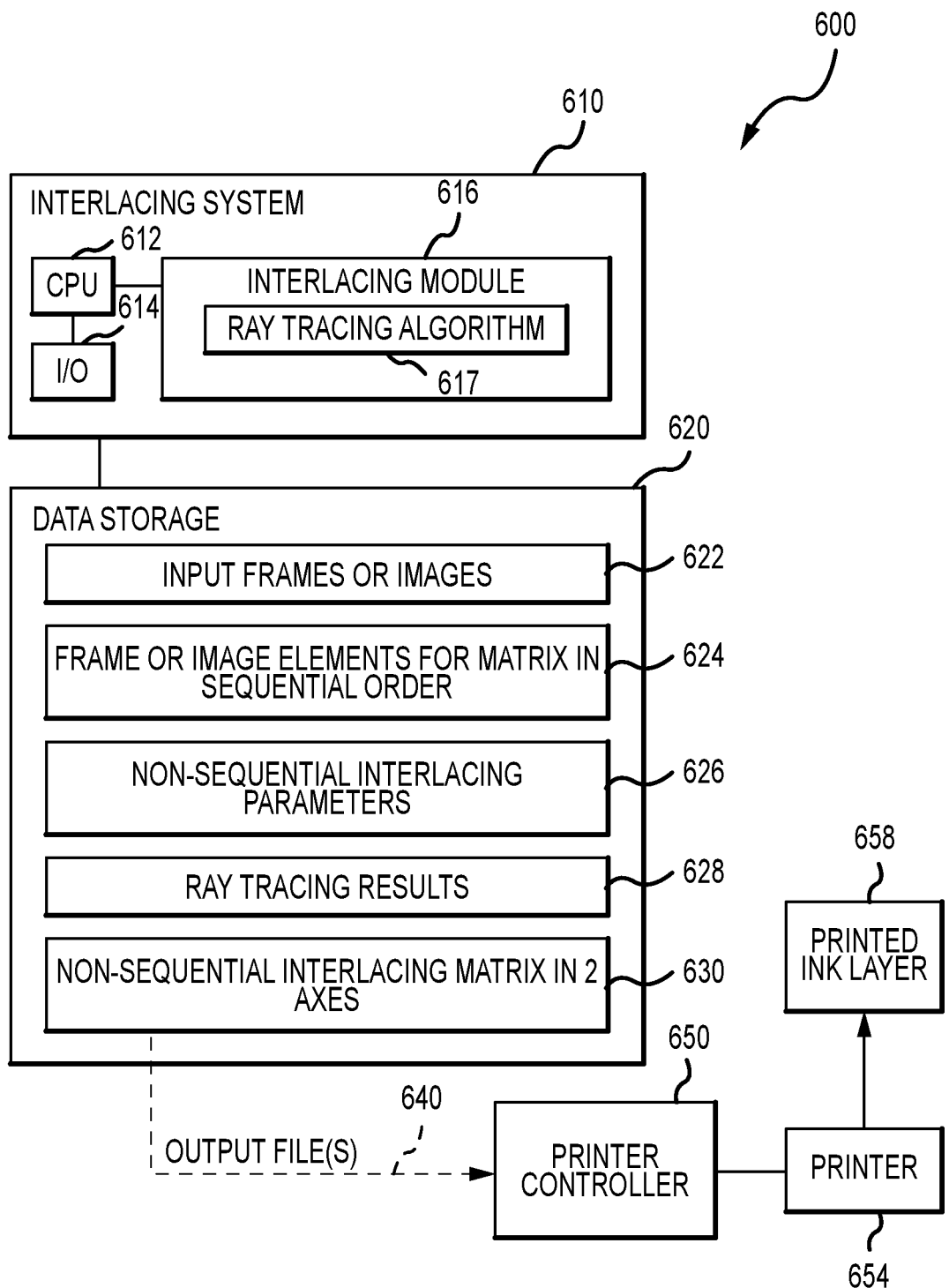
FIG. 6 is a functional block diagram of a portion of an optical security element fabrication system.

FIG. 6 is a functional block diagram of a portion of an optical security element fabrication system 600. As shown, the system 600 includes an interlacing system 610, which may take the form of nearly any computer or computing device configured to execute code or instructions and/or to run software useful to provide the interlacing functions described herein. To this end, the system 610 includes a processor(s) 612 that executes code or instructions to provide the functionality of an interlacing module 616. The interlacing module 616 is shown to include (or be able to call or access) a ray tracing algorithm 617. The processor 612 manages a set of input/output (I/O) devices 614 that allow a user to interact with the system 610 such as be providing user input through a mouse, a keyboard, a touchscreen, and the like and to view data such as on monitor or display or via a printer. The I/O devices 614 are also configured to facilitate wired or wireless communications with the data storage 620 (which may be provided in the system 610 or be accessible, as shown, by the system 610) during running of the interlacing module 616.

The memory or data storage 620 is shown to be used to store input or received frames or images 622 for use in creating an interlaced image for an optical security element. The interlacing module 616 may be configured to process the data 622 to form a plurality of frame or image elements 624 for use in forming the interlaced image or matrix (which may be a 39 by 39 matrix in some of the above examples) to be provided under each lens set or virtual lens of lens array of an optical security element. The size of the matrix or number of frame or image elements provided on a side is determined so as to use a number of elements so that there is a mismatch between the resolution and the lens space (e.g., such that a frame or element (or pixel) is always located between each adjacent pair of lenses in a lens set rather than all being under any individual lens). These elements 624 are sized to suit the size of the lens set (area under all the lenses that are being combined) and/or to achieve a desired resolution and/or visual effect. Typically, these elements 624 are initially arranged or stored in sequential order in two directions or along two interlacing axes (such as from 1 to 11, 1 to 39, and so on) as if conventional interlacing were to be utilized.

The data storage 620 further is used to store a number of non-sequential interlacing parameters 626 to be used by the interlacing module 616 in generating a non-sequential interlacing matrix defining locations of all the frame or image elements 624 in a printed ink layer or interlaced image 658 output by a printer 654. These may have default values or be set or modified based on user input operating the system 610. The parameters 626 may include a definition of how close or near in the sequential ordering 624 the frame or image elements are desired to be under the lenses of the virtual lens or lens set. As discussed, it is desirable that the lenses along each axis concurrently focus on "close" frames or image elements (but not the same one) such as within 1 to 5 frames/image elements in the sequential ordering with a lower number being closer and often preferred. The parameters 626 may also include a setting defining. The parameters 626 may also include lens size, output resolution, set of lenses (2 by 2, 2 by 3, 2 by 4, or the like), shape of array or grouping for lens sets (e.g., classic column and row configuration, hex-shaped arrays, and the like), and/or other parameters useful in generating the non-sequential interlacing described herein.

The ray tracing algorithm or program 617 is then called or run by the interlacing module 616 to provide output or results 628 useful to create a non-sequential interlacing matrix 630 based on the input data 624 and 626. The ray tracing program 617 is configured to take as input the non-sequential interlacing parameters 626 as well as the number of frame or image elements to be provided on a side of the matrix (as noted in data 624) as well as the design of and number of the lenses in each virtual lens or lens set. The output or results 628 of the ray tracing algorithm 617 is configured to ensure that rays exiting the lenses of the virtual lens are in correct order to a viewer even with use of a non-sequential order of the frame or image elements.

Based on the ray tracing results 628, the interlacing module 616 generates a non-sequential interlacing matrix in two axes 630 assigning the frame or image elements 624 to the locations or rows and columns of the matrix. As shown, this matrix 630 is used by the system 600 to provide an output or print-control file 640 to a printer controller 650. The controller 650 uses the output file 640 to operate a printer 654 to print the printed ink layer 658, e.g., upon a planar back surface of a lens array to form an optical security element, upon a surface of a product's body upon which a lens array with a plurality of lens sets (or lenses used in combination as virtual lenses) will be applied so as to align the lens sets with the interlaced image, or the like.

From the above discussion, it should be clear to one skilled in the art that the "non-sequential" aspect of the interlaced images comes from or is provided via output of the ray tracing software or algorithm(s) and then interlacing is performed. A variety of interlacing techniques may be used as long as interlacing is performed in both axes with the non-sequential information coming from the ray tracing. Likewise, a variety of ray tracing programs or algorithms may be used to provide the non-sequential information or ray tracing output for use in the interlacing of the frames or image elements. For example, but not as a limitation, the ray tracking methods taught in U.S. Pat. No. 7,480,100, which is incorporated herein by reference, may be used with modifications if and as needed (and as would be understood by those skilled in the art of ray tracing) to produce the non-sequential information useful for interlacing in two axes as described herein.

Figure 7:
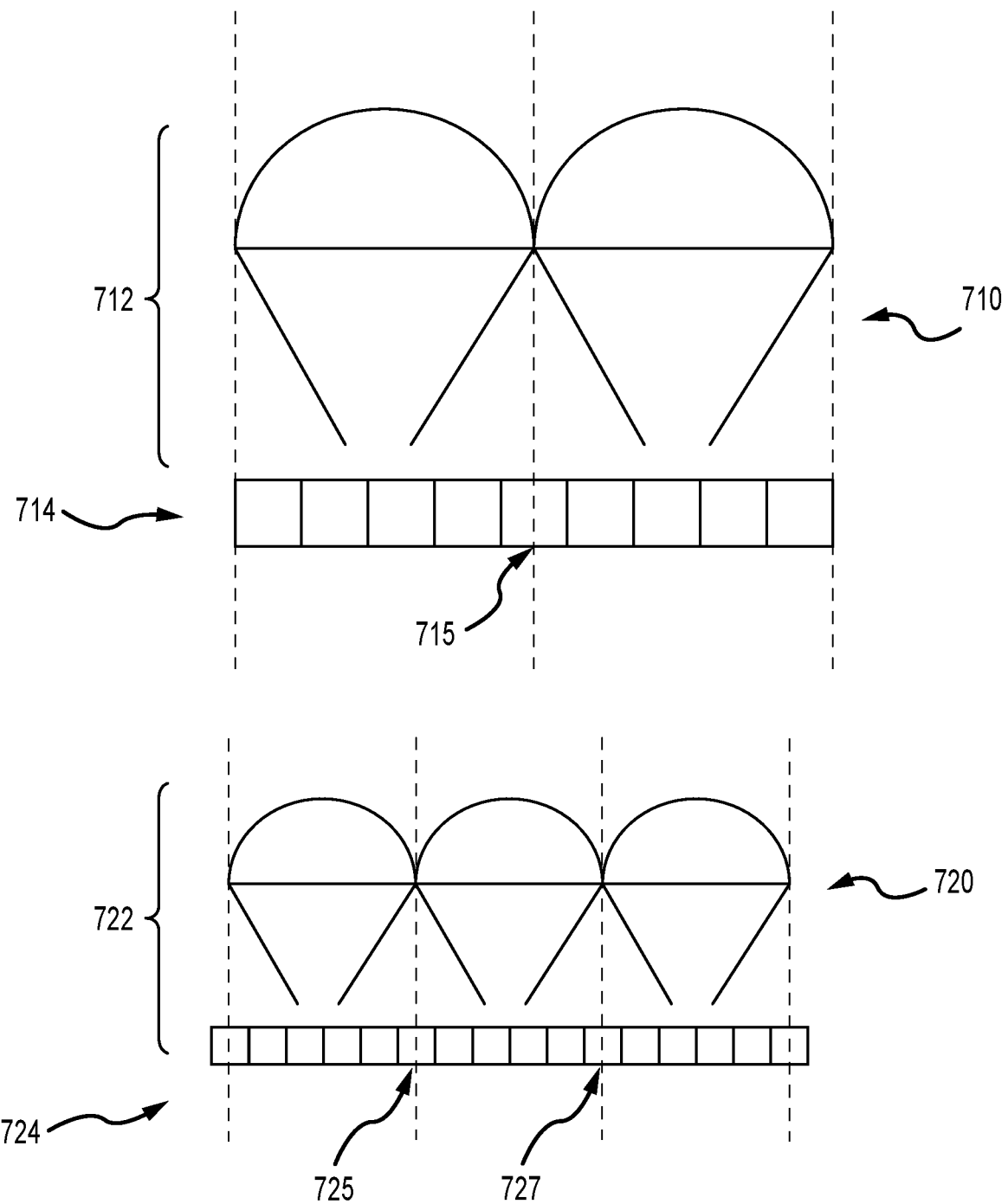
FIG. 7 illustrates two side views, similar to FIG. 5, showing enlarged views of two optical security elements with virtual lens sets and with a non-sequential interlaced image providing a desired mismatch between resolution and lens space of the present description.

FIG. 7 illustrates two side views, similar to FIG. 5, showing enlarged views of two optical security elements 710 and 720 with virtual lens sets and with a non-sequential interlaced image providing a desired mismatch between resolution and lens space of the present description. Optical security element 710 includes a lens array 712 with two lenses along a first side shown in cross (a second side would contain 2, 3, 4, or more lenses). The lens array 712 is mated with an ink layer or interlaced image 714 under the lenses with a plurality of frame or image elements (pixels) arranged in a non-sequential order. Further, as shown, the number of frame or image elements is selected (e.g., to have an odd number since lens array 712 has an even number of lenses on this side) to provide a mismatch that causes a frame or image element (or pixel) 715 to be positioned between the two lenses of the array 712 (e.g., at least partially below or underneath the seam or valley between adjacent lenses in the lens array 712).

Similarly, optical security element 720 includes a lens array 722 with three lenses along a first side shown in cross (a second side would contain 2, 3, 4, 5 or more lenses). The lens array 722 is mated with an ink layer or interlaced image 724 under the lenses with a plurality of frame or image elements (pixels) arranged in a non-sequential order. As shown, the number of frame or image elements is selected (e.g., to have an even number since lens array 712 has an odd number of lenses on this side) to provide a mismatch that causes a frame or image element (or pixel) 725 or 727 to be positioned between the lenses of the array 722 (e.g., at least partially below or underneath the seam or valley between adjacent pairs of lenses in the lens array 722).

We claim:

1. An optical security element for application to a product to limit counterfeiting, comprising:
   a lens array with a first side and a second planar side opposite the first side; a plurality of lenses formed on the first side of the lens array; and
   an ink layer proximate the second planar side, wherein the ink layer comprises:
      an interlaced image under a plurality of lens sets within the lenses formed on the first side of the lens array, wherein:
      each lens set of the plurality of lens sets comprises at least a unit of four lenses, at least one lens of each lens set focuses on only one whole pixel per spot focus direction;
      the interlaced image comprises a matrix having a number of pixels for each lens set wherein the number of pixels for each lens set divided by the number of lenses in each lens set is a non-integer;
      the pixels in the matrix under each set of lenses are arranged according to a ray tracing program in two interlacing axes; and
      the arrangement of the pixels in the matrix is configured to provide a pre-determined mismatch, whereby at least one pixel of the pixels are located between adjacent lenses of the lens sets.

2. The optical security element of claim 1, wherein the at least four lenses are arranged in a grouping with an equal number of lenses on a side.

3. The optical security element of claim 1, wherein the arrangement is configured to place the pixels, under adjacent ones of the lenses in the grouping at matching focus locations, such that the placed pixels are within at least five within a sequential ordering of the pixels.

4. The optical security element of claim 1, wherein the at least four lenses are arranged in a grouping with a greater number of the at least four lenses on a first side than on a second side.

5. The optical security element of claim 1, wherein the lenses are round, square, hexagonal, radius, or elliptical lenses.

6. The optical security element of claim 1, wherein the lens array has a thickness of less than about 200 microns, wherein the lenses are flat or no-profile lenses, and wherein each of the lenses is a concave or convex lens.

7. The optical security element of claim 6, wherein the thickness of the lens array is less than 50 microns, wherein the interlaced image is printed at a resolution greater than 5,000 dots per inch (DPI), and wherein a viewing angle of each of the lenses is less than about 58 degrees.

8. The optical security element of claim 1, wherein a total number of the pixels in the matrix is greater than twenty-five.

9. A product comprising a body with a surface upon which the optical security element of claim 1 is affixed.

10. The product of claim 9, wherein the body is a body of a banknote and the optical security element is stamped via hot melt adhesive to the body.

11. The optical security element of claim 1, wherein the lenses are made via cast and cure ultraviolet (UV) or via E-beam energy-cured polymers.

12. An optical security element, comprising:
a lens array comprising a plurality of spot focusing lenses on a first side, wherein the spot focusing lenses are arranged into 2 by 2 lens sets, at least one spot focusing lens of each lens set focuses on only one whole pixel per spot focus direction; and
an interlaced image on or proximate to a second side of the lens array opposite the first side, wherein:
    the interlaced image comprises a matrix having a number of pixels under each lens set of each spot focusing lens of the plurality of spot focusing lenses wherein the number of pixels for each lens set divided by the number of lenses in each lens set is a non-integer;
    the pixels of each of the matrices under each set of lenses are interlaced based on a ray tracing program along orthogonal interlacing axes of each lens set; and
    the interlacing of the pixels in the matrix is configured to provide a pre-determined mismatch, whereby at least one pixel is located between adjacent lenses of the lens sets.

13. The optical security element of claim 12, wherein the matrix is configured to have an odd number of the pixels greater than five on each side so as to provide the pre-determined mismatch between.

14. The optical security element of claim 12, wherein the number of pixels are arranged in the matrix such that pairs of the pixels placed under matching focus points under adjacent pairs of the lenses in each of the lens sets are within five positions in a sequential ordering of the pixels.

15. An optical security element for application to a product to limit counterfeiting, comprising:
a lens array with a first side and a second planar side opposite the first side;
a plurality of lenses formed on the first side of the lens array, at least one lens of each lens set focuses on only one whole pixel per spot focus direction; and
an interlaced image on or proximate the second planar side, wherein:
    the interlaced image is formed based on a ray tracing program in both directions to define a matrix having a number of pixels under each lens set of a plurality of lens sets within the lenses formed on the first side of the lens array wherein the number of pixels for each lens set divided by the number of lenses in each lens set is a non-integer:
    each lens set of the plurality of lens sets comprises at least a unit of four lenses arranged to have an equal or unequal number of lenses on a side; and
    the pixels provided in the interlaced image in both directions is selected to position at least one of the pixels between each pair of adjacent ones of the lens in each unit of at least a unit of four lenses of each lens set of the plurality of lens sets to create a pre-determined mismatch.

16. The optical security element of claim 15, wherein the pixels, under adjacent ones of the lenses in the grouping at matching focus locations, are within at least five within a sequential ordering of the pixels.

17. The optical security element of claim 15, wherein the lenses are round, square, hexagonal, radius, or elliptical lenses.

18. The optical security element of claim 15, wherein the lens array has a thickness of less than about 200 microns, wherein the lenses are flat or no-profile lenses, and wherein each of the lenses is a concave or convex lens.

19. The optical security element of claim 18, wherein the thickness of the lens array is less than 50 microns, wherein the interlaced image is printed at a resolution greater than 5,000 dots per inch (DPI), and wherein a viewing angle of each of the lenses is less than about 58 degrees.

20. The optical security element of claim 15, wherein a total number of the pixels in the matrix is greater than twenty-five.

21. A product comprising a body with a surface upon which the optical security element of claim 15 is affixed.

* * * * *